UNITED STATES PATENT OFFICE.

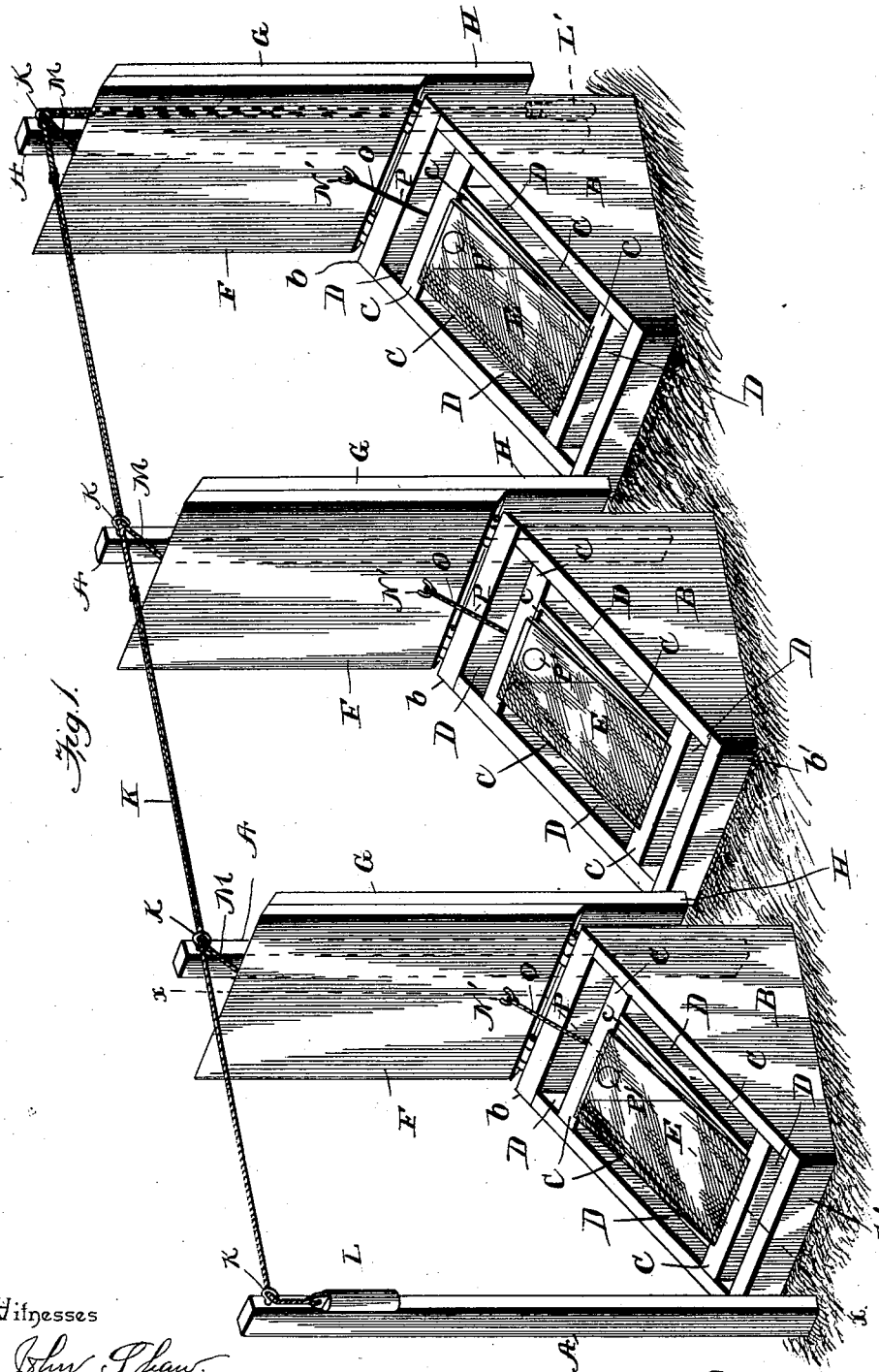

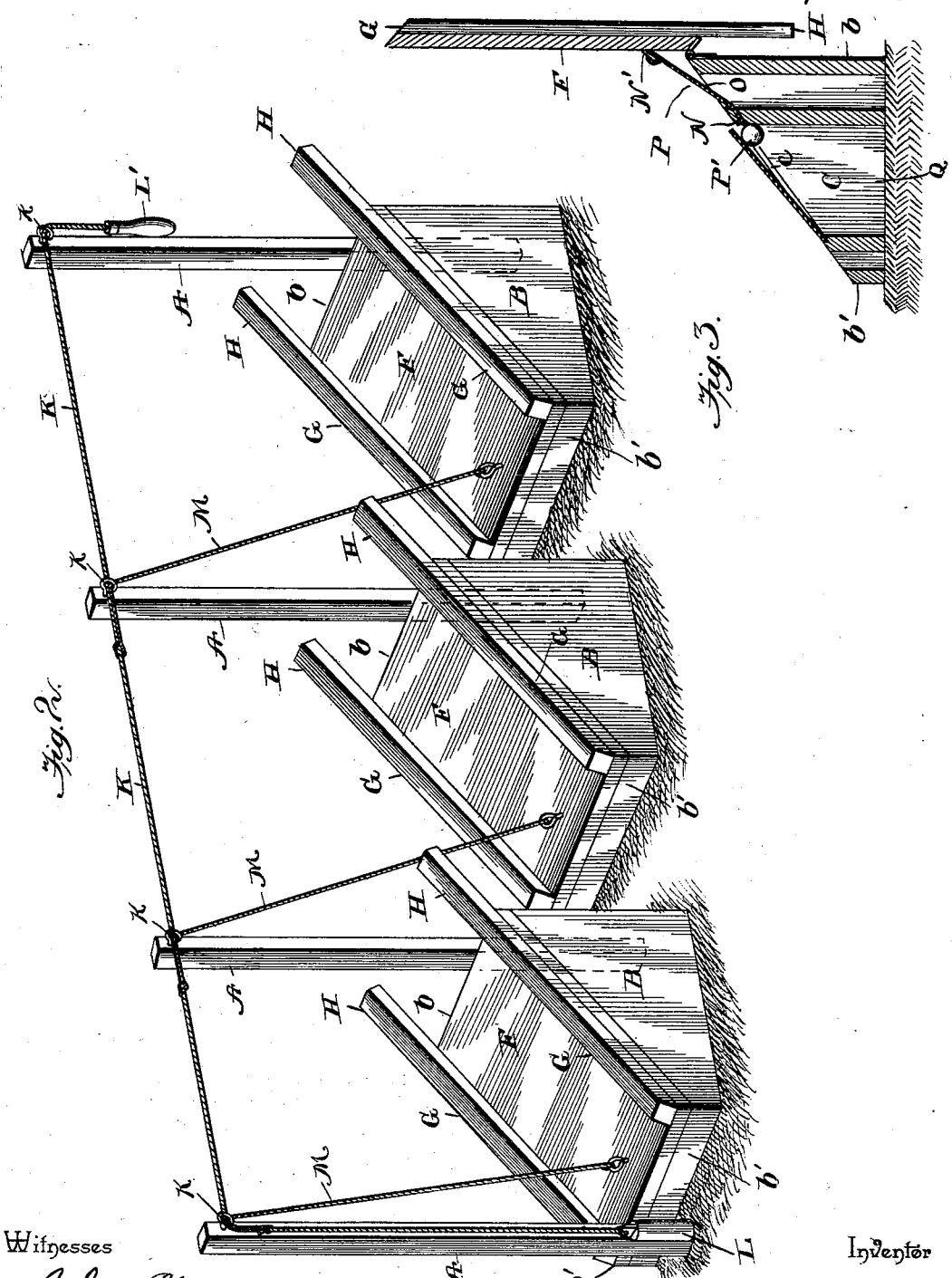

ALEXANDER C. DAVIS, OF KOKOMO, INDIANA.

PLANT-PROTECTOR.

SPECIFICATION forming part of Letters Patent No. 508,209, dated November 7, 1893.

Application filed January 26, 1893. Serial No. 459,803. (No model.)

*To all whom it may concern:*

Be it known that I, ALEXANDER C. DAVIS, a citizen of the United States, residing at Kokomo, in the county of Howard and State of Indiana, have invented a new and useful Plant-Protector, of which the following is a specification.

The invention relates to improvements in plant protectors or forcing boxes, and it has for its objects to provide boxes which may be arranged over the hills in which seeds are planted at the places where the plants are to remain, to avoid transplanting, and to provide such boxes with means to exclude excessive moisture, cold, &c., and admit light and air.

It is a further object of this invention to provide simple and effective means for operating a series of boxes simultaneously, to open, close, admit air, &c.

Further objects and advantages of the invention will appear in the following description, and the novel features thereof will be particularly pointed out in the appended claims.

In the drawings: Figure 1 is a perspective view of a series of protectors or forcing-boxes, all of which are open. Fig. 2 is a similar view with the boxes closed. Fig. 3 is a vertical central sectional view, on line x—x of Fig. 1, of one of the boxes.

A A represent vertical standards arranged on the line of the proposed series of protectors or forcing boxes, and B B the protectors or forcing boxes, which are preferably arranged with the open sides toward the south, their rear sides b extending higher than their front sides b' and the upper edges of their lateral sides being beveled to agree with the difference of level of the front and rear, as clearly shown in Figs. 1 and 3.

Vertical partitions C C are arranged in each box, parallel, respectively, with the sides or walls of the box, and spaced therefrom, respectively, to form chambers D D in which may be placed dry saw-dust, earth, manure, sand, or other material which will act as a non-conductor of heat and at the same time exclude excessive moisture. The upper edges of the partitions C are rabbeted to form seats, c c, for the glass plates E, whose upper or outer surfaces are thus arranged in the plane of the upper edges of the sides of the box.

F represents the covers or lids, which are hinged at one edge to the upper edges of the rear sides of the boxes and are provided with longitudinal cleats G, which extend rearwardly beyond the same to form stops H H to engage the rear sides of the boxes when the covers or lids are raised to a vertical position.

K represents an operating-cord, which extends horizontally through guide-eyes, k, upon the standards, and is provided at one end with a weight L, and at the opposite end with a handle or ring L'. Short, independent connecting-cords M, are employed to connect the free ends of the covers or lids to the operating-cord, whereby when the latter is moved all the covers or lids are operated simultaneously.

Any number of boxes may be arranged in a series to be operated at one time, for the reason that the connections and means employed are simple and direct and cause but slight friction in operation.

Passing through a guide N in the rear side of the box and connected to a staple or eye N' upon the under surface of the cover or lid near its hinged edge is the flexible connection, O, of a tripping device P, such being provided with a ball or weight, P', which operates inside the growing compartment, Q, of the box. As the covers or lids are raised by the manipulation of the operating cord, these tripping-devices are drawn up until, just before the covers or lids reach the limit of their upward movement, the balls or weights P' engage the upper edges of the glass-plates and raise the same sufficiently to admit fresh air into the growing compartments Q. The weight of a ball is insufficient to return the cover or lid to its closed position, and hence it is held elevated by the cover. The ball is heavy enough to draw the connection through the guide when the connection is slackened by lowering the cover. The boxes, including the surrounding chambers, are bottomless, and the walls of the growing-chamber inclose or surround a hill in which seed is planted. The plants as they grow are protected from winds, frost and excessive moisture, and at the same time bugs are excluded while the plants are young and susceptible to their attacks. Light and heat may be allowed to penetrate to the interior of the growing chambers by elevating the covers or lids sufficiently to permit the sun's rays to strike the glass plates, and when necessary and desirable the glass plates may be elevated at their upper edges sufficiently to cause a circulation of air. The glass plates being loose, simply fitted in rabbeted seats, may be removed to water the plants. When the weather has become sufficiently warm to justify the permanent exposure of the plants the boxes are simply raised and removed, the filling of nonconducting material falling around the hill of plants to form a future fertilizer or provide material for future hilling.

Changes in the form, proportion and minor details of construction may be resorted to without departing from the spirit or sacrificing any of the advantages of the invention.

Having thus described my invention, what I claim, and desire to secure by Letters Patent, is—

1. A plant protector or forcing box having a bottomless growing compartment surrounded by non-conducting spaces provided with bottoms or floors and a cover or lid adapted to close the growing compartment and surrounding spaces, substantially as specified.

2. In a plant protector or forcing box, the glass plates covering the growing compartment, the hinged cover or lid, tripping devices connected to the cover or lid to elevate the glass plates, and means to operate the cover or lid, substantially as specified.

3. In a plant protector or forcing box, provided with glass plates covering the growing compartment, the cover or lid provided with stops H, the tripping device having a ball or weight adapted to engage the glass plate and a flexible connection attached to the cover or lid, and means to operate the cover or lid, substantially as specified.

In testimony that I claim the foregoing as my own I have hereto affixed my signature in the presence of two witnesses.

A. C. DAVIS.

Witnesses:
  LEVI P. RICH,
  FRED GEORGE.